(12) United States Patent
Lin et al.

(10) Patent No.: US 10,988,574 B2
(45) Date of Patent: Apr. 27, 2021

(54) METHOD OF PRODUCING OLIGOMER OR POLYMER WITH CARBONATE SEGMENT CHEMICAL STRUCTURE

(71) Applicant: J & A TECHNOLOGY CORPORATION, Taipei (TW)

(72) Inventors: Jiang-Jen Lin, Taipei (TW);
Tzong-Ming Lee, Chutung (TW);
Chyi-Ming Leu, Chutung (TW);
Sheng-Yen Shen, Taipei (TW);
Hsin-Chung Wu, Chutung (TW);
Hsuan-Hao Tien, Taipei (TW)

(73) Assignee: J & A TECHNOLOGY CORPORATION, Taipei (TW)

( * ) Notice: Subject to any disclaimer, the term of this patent is extended or adjusted under 35 U.S.C. 154(b) by 142 days.

(21) Appl. No.: 16/532,716

(22) Filed: Aug. 6, 2019

(65) Prior Publication Data

US 2020/0339746 A1  Oct. 29, 2020

(30) Foreign Application Priority Data

Apr. 25, 2019  (TW) .................................. 108114478

(51) Int. Cl.
*C08G 64/38* (2006.01)
*C08G 64/30* (2006.01)
*C08L 69/00* (2006.01)

(52) U.S. Cl.
CPC ........... *C08G 64/38* (2013.01); *C08G 64/305* (2013.01); *C08L 69/005* (2013.01); *C08G 2115/00* (2021.01)

(58) Field of Classification Search
USPC ......................................... 528/271, 272, 371
See application file for complete search history.

(56) References Cited

FOREIGN PATENT DOCUMENTS

TW          201817809     *   6/2018

OTHER PUBLICATIONS

Chiou J et. al. "Chemical method for converting polyester of high molecular weight into thermoplastic elastomer and thermoplastic elastomer by adding a reactive oligomer and a catalyst to recycled broken pieces, ground powder and reproduced particles of polyester of high molecular weight".TW201817809 (Year: 2018).*

* cited by examiner

*Primary Examiner* — Terressa Boykin
(74) *Attorney, Agent, or Firm* — Schmeiser, Olsen & Watts, LLP

(57) ABSTRACT

A method of producing an oligomer or polymer with carbonate segment chemical structure, the method including the steps of (1) introducing into a reactor high-molecular-weight polyester and reactive oligomer; (2) introducing into the reactor a carbonate compound and a catalyst such that the poly(polyol) reacts with the carbonate monomers by one-pot in situ to produce a crude product; and (3) introducing the crude product into water to obtain an oligomer or polymer with carbonate segment chemical structure. The oligomer or polymer with carbonate segment chemical structure is applicable to automobile manufacturing, wires & cables, and medical equipment.

20 Claims, 2 Drawing Sheets

S101: introduce into a reactor high-molecular-weight polyester and reactive oligomer, wherein the high-molecular-weight polyester is expressed by formula (A),

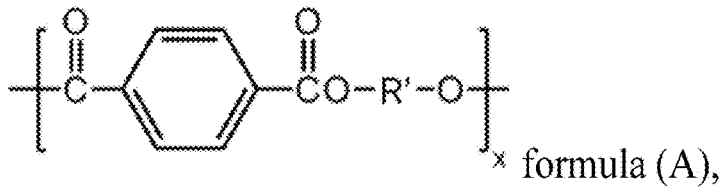

formula (A),

R' is branched or linear C1-6 alkylidene, wherein the reactive oligomer is one selected from the group consisting of poly(polyol) and poly(polyamine)

S102: introduce into the reactor a carbonate compound and a catalyst such that the poly(polyol) reacts with the carbonate monomers by one-pot in situ to produce oligomer polycarbonate diol compound (HO-R"-O C(O)-O-R"-OH), wherein R" is a functional group derived from polyol, polyester polyol or polyether polyol, partially substitute for the chemical structure (-O-R'-O-) in the high-molecular-weight polyester, remove, by vacuum distillation-based regulation, alcohol (HO-R'-OH) produced as a result of ester exchange reaction and substitution, so as to produce a crude product S103: introduce the crude product into water to obtain an oligomer or polymer with carbonate segment chemical structure

FIG. 1

METHOD OF PRODUCING OLIGOMER OR POLYMER WITH CARBONATE SEGMENT CHEMICAL STRUCTURE

CROSS-REFERENCE TO RELATED APPLICATION

This non-provisional application claims priority under 35 U.S.C. § 119(a) on Patent Application No(s). 108114478 filed in Taiwan, R.O.C. on Apr. 25, 2019, the entire contents of which are hereby incorporated by reference.

BACKGROUND OF THE INVENTION

1. Field of the Invention

The present disclosure relates to methods of producing an oligomer or polymer, and in particular to a method of producing an oligomer or polymer with carbonate segment chemical structure.

2. Description of the Related Art

Polycarbonate (PC), an engineering plastic with excellent properties, has advantages as follows: resistant to hydrolysis, high mechanical strength, resistant to impacts, dimensionally stable, resistant to heat, and UV resistant. Therefore, polycarbonate (PC) is widely used in automobile manufacturing, wires & cables, electronic products and medical equipment.

Conventional methods of manufacturing polycarbonate and polycarbonate diol (PCDL) are as follows: 1. ester exchange; 2. phosgenation process; 3. cyclic carbonate ring opening polymerization; 4. carbon dioxide and epoxide polymerization. The phosgene used in the phosgenation process is highly toxic and is a notorious pollutant. A cyclic carbonate with a ring of six or more than six members, which is a required constituent of a raw material for use in the cyclic carbonate ring opening polymerization, is difficult to produce. Furthermore, the ring opening process fails to control the molecular weight of its products. Therefore, at present, polycarbonate diol and polycarbonate are synthesized by ester exchange, wherein polycarbonate diol products are raw materials for use in production of thermoplastic polyurethane.

Conventional polycarbonate (PC) and the other polymeric granules, such as PET granules, PVC granules, and PE granules, are blended and then undergo injection molding to produce PC/PET alloys.

However, there is still room for improvement of conventional polycarbonate (PC) in terms of yield and raw material costs.

BRIEF SUMMARY OF THE INVENTION

In view of the aforesaid drawbacks of the conventional method of producing polycarbonate (PC), an objective of the present disclosure is to provide a method of producing an oligomer or polymer with carbonate segment chemical structure.

To achieve at least the above objective, the present disclosure provides a method of producing an oligomer or polymer with carbonate segment chemical structure, the method comprising the steps of:

(1) introducing into a reactor high-molecular-weight polyester and reactive oligomer, wherein the high-molecular-weight polyester is expressed by formula (A),

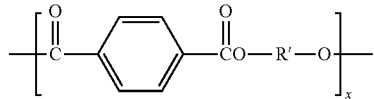

R' is branched or linear $C_{1-6}$ alkylidene,
wherein the reactive oligomer is one selected from the group consisting of poly(polyol) and poly(polyamine);
(2) introducing into the reactor a carbonate compound and a catalyst such that the poly(polyol) reacts with the carbonate monomers by one-pot in situ to produce oligomer polycarbonate diol compound (HO—R"—O C(O)—O—R"—OH), wherein R" is a functional group derived from polyol, polyester polyol or polyether polyol, partially substitute for the chemical structure (—O—R'—O—) in the high-molecular-weight polyester, remove, by vacuum distillation-based regulation, alcohol (HO—R'—OH) produced as a result of ester exchange reaction and substitution, so as to produce a crude product; and
(3) introducing the crude product into water to obtain an oligomer or polymer with carbonate segment chemical structure.

Regarding the method, the high-molecular-weight polyester is polyethylene terephthalate (PET). In step (2), the reactive oligomer at least partially substitutes for ethylenedioxy (—OCH$_2$CH$_2$O—) in PET, and ethylene glycol produced as a result of substitution is removed by vacuum distillation to form a crude product.

Regarding the method, wherein the carbonate compound is one selected from the group consisting of ethylene carbonate, propylene carbonate, dimethyl carbonate, diethyl carbonate, and diphenyl carbonate.

Regarding the method, wherein the poly(polyol) is one selected from the group consisting of polytetramethylene ether glycol (PTMEG), poly(propylene glycol), poly(ethylene glycol), polyether polyol, polyester polyol, polyol(polyester-ether polyol), and tri-functional poly(oxypropylene) polyol.

Regarding the method, wherein the molecular weight of the polyether polyol ranges from 250 to 8000 g/mol.

Regarding the method, wherein a weight ratio of the high-molecular-weight polyester to the reactive oligomer ranges from 95:5 to 30:70.

Regarding the method, wherein the poly(polyamine) is one selected from the group consisting of poly(oxypropylene)-diamine, poly(oxyethylene)-diamine, ethylene diamine, diethylene-triamine, triethylene-tetra-amine, tetra-ethylene-penta-amine, and 1,6-hexamethylene-diamine.

Regarding the method, wherein a molecular weight of the poly(oxyalkylene)-diamine ranges from 250 to 6000 g/mol.

Regarding the method, wherein the ratio of the poly (polyol) to the poly(polyamine) in a mixture thereof ranges from 1:9 to 9:1.

Regarding the method, wherein the step (1) occurs in a nitrogen gas or aspirator vacuum environment.

Regarding the method, wherein the catalyst is titanium (Ti) or antimony (Sb).

Regarding the method, wherein the catalyst is 30~1000 ppm relative to the reactive oligomer.

Regarding the method, wherein the weight ratio of the reactive oligomer/high-molecular-weight polyester ranges from 5 to 70%.

Regarding the method, wherein the PET is solid PET particles, recycled PET bottle debris or recycled fabric scraps.

The present disclosure provides a method of producing an oligomer or polymer with carbonate segment chemical structure, which entails performing ester exchange between the monomers of cyclic carbonate monomers and at least one diol monomer in the presence of high-molecular-weight polyester (such as, recycled PET) so as to form polycarbonate diol oligomer, which is then incorporated into polyester polymer by ester-exchange reaction, to therefore produce high-molecular-weight oligomer or polymer with carbonate segment chemical structure.

According to the present disclosure, the method of producing an oligomer or polymer with carbonate segment chemical structure comprises the steps of: (1) introducing into a reactor high-molecular-weight polyester solid (including PET or recycled PET scraps), polyols (such as diethylene glycol (DEG), ethylene glycol (EG), polyester polyol, polyether polyols, such as PEG, PPG, PTMEG), and ethylene carbonate (EC) or dimethyl carbonate (DMC); (2) introducing into the reactor a catalyst such that the polyols react with the carbonate monomers by one-pot in situ to produce oligomer polycarbonate diol compound (HO—R"—O C(O)—O—R"—OH) and partially substitute for the chemical structure (—O—R'—O—) in the high-molecular-weight polyester and remove by vacuum distillation-based regulation alcohol (HO—R'—OH) produced by ester exchange reaction and substitution, thereby forming a crude product, such that polyester polymer crude products, which are of different molecular weights and contain carbonate groups, are produced from EG (R'=CH$_2$CH$_2$) in the PET; and introduce the high-molecular-weight crude products into water, so as to obtain the oligomer or polymer with carbonate segment chemical structure.

In the same manufacturing process, optionally, given the vacuum distillation-based regulation, removal of alcohol (HO—R'—OH) decreases, and then the resultant low molecular weight crude products undergo filtration, so as to obtain a carbonate-containing polyester plasticizer and diol.

The oligomer or polymer with carbonate segment chemical structure, as produced by the method of the present disclosure, can form a plasticizer or a thermoplastic elastomer. The plasticizer and diol, as produced by the method of the present disclosure, are applicable to optical film, woodlike construction materials and resins. The thermoplastic elastomer, as produced by the method of the present disclosure, has excellent physical and chemical properties and thus is applicable to automobile manufacturing, wires & cables, and medical equipment.

BRIEF DESCRIPTION OF THE DRAWINGS

FIG. 1 is a flowchart of a production method according to an embodiment of the present disclosure.

DETAILED DESCRIPTION OF THE INVENTION

Figure 2:
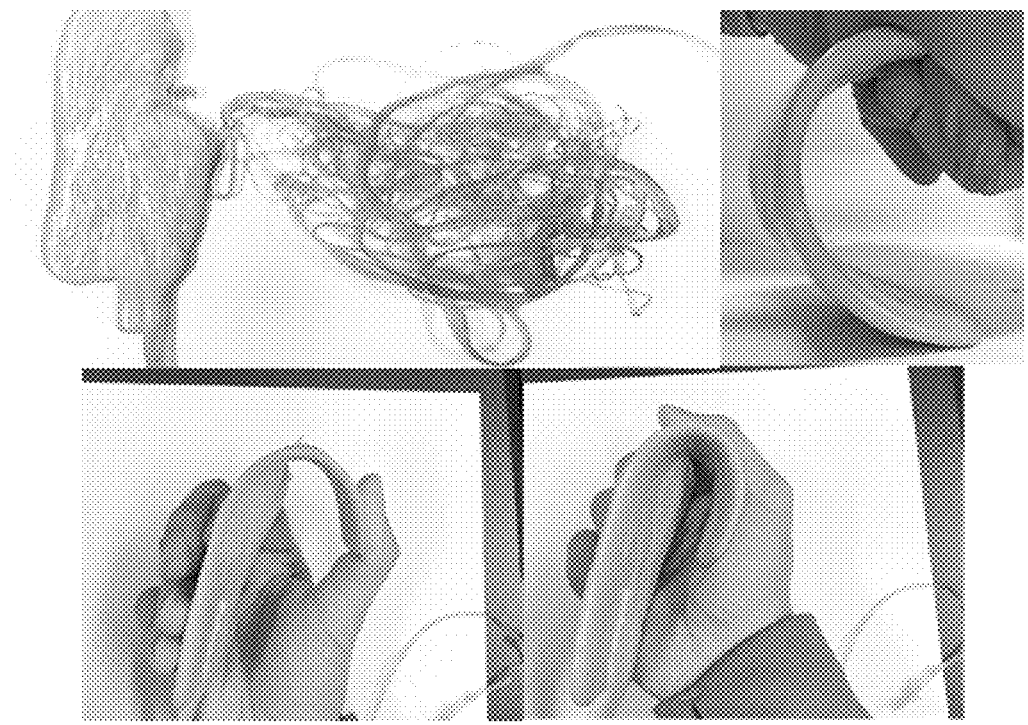
FIG. 2 shows pictures of the bending and appearance of thermoplastic polyester-carbonate elastomer (TPECE) produced according to embodiment 1 of the present disclosure.
Figure 3:
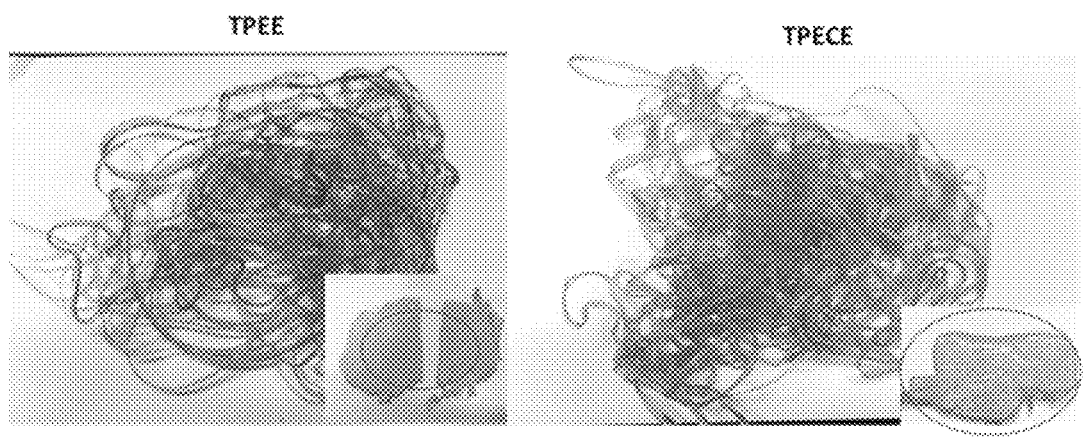
FIG. 3 shows pictures for comparing thermoplastic polyester elastomer (TPEE) produced in embodiment 2 with the TPECE produced in embodiment 1 in terms of bending and appearance.

To facilitate understanding of the object, characteristics and effects of this present disclosure, embodiments together with the attached drawings for the detailed description of the present disclosure are provided.

Referring to FIG. 1, the present disclosure provides a method of producing an oligomer or polymer with carbonate segment chemical structure, the method comprising the steps of:
(1) introducing into a reactor high-molecular-weight polyester and reactive oligomer, wherein the high-molecular-weight polyester is expressed by formula (A),

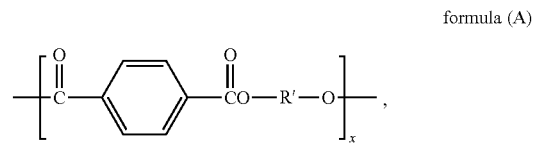

formula (A)

R' is branched or linear C$_{1-6}$ alkylidene,
wherein the reactive oligomer is one selected from the group consisting of poly(polyol) and poly(polyamine) (S101);
(2) introducing into the reactor a carbonate compound and a catalyst such that the poly(polyol) reacts with the carbonate monomers by one-pot in situ to produce oligomer polycarbonate diol compound (HO—R"—O C(O)—O—R"—OH), wherein R" is a functional group derived from polyol, polyester polyol or polyether polyol, partially substitute for the chemical structure (—O—R'—O—) in the high-molecular-weight polyester, remove, by vacuum distillation-based regulation, alcohol (HO—R'—OH) produced as a result of ester exchange reaction and substitution, so as to produce a crude product (S102); and
(3) introducing the crude product into water to obtain an oligomer or polymer with carbonate segment chemical structure (S103).

The oligomer or polymer with carbonate segment chemical structure, as produced by the method of the present disclosure, is expressed by formula I,

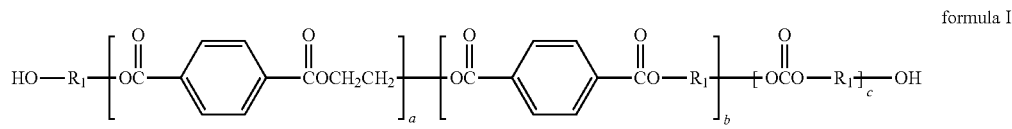

formula I

In formula I, R$_1$ is a functional group derived from polyol, polyester polyol or polyether polyol.

In step (1), the high-molecular-weight polyester is in the form of solid sheets, particles or powder, which originates from recycled bottles or any other containers made of high-molecular-weight polyester. To be specific, the high-molecular-weight polyester is polyethylene terephthalate (PET), polytrimethylene terephthalate or polybutylene terephthalate.

In the poly(polyol), the of hydroxyl group is not limited by the present disclosure. For instance, the poly(polyol) is diol, triol or tetraol. Preferably, the molecular weight of the polyether polyol ranges from 250 to 8000 g/mol. To be specific, the poly(polyol) is polytetramethylene ether glycol (PTMEG), poly(propylene glycol), poly(ethylene glycol), polyol (tri-functional poly(oxypropylene) polyol), or a mixture thereof, but the present disclosure is not limited thereto. The poly(oxyalkylene)-diamine is poly(oxypropylene)-diamine or poly(oxyethylene)-diamine, or a mixture thereof, but the present disclosure is not limited thereto. Preferably, the molecular weight of the poly(oxyalkylene)-diamine ranges from 250 to 8000 g/mol. In formula (A), x preferably ranges from 50 to 500, but the present disclosure is not limited thereto.

In step (1), the catalyst is titanium (Ti) or antimony (Sb), but the present disclosure is not limited thereto. The catalyst may also be magnesium (Mg), aluminum (Al), sodium (Na), potassium (K), any other metallic salt, or organometallic compound.

In step (2), ethylene carbonate (EC) can be changed to propylene carbonate, dimethyl carbonate, diethyl carbonate, diphenyl carbonate, or a mixture thereof, but the present disclosure is not limited thereto.

The reactive oligomer is one selected from the group consisting of poly(polyol) and poly(polyamine). The poly(polyol) and ethylene carbonate (EC) substitute for the ethylenedioxy (—OCH$_2$CH$_2$O—) in PET by ester exchange; hence, the resultant oligomer or polymer with carbonate segment chemical structure is thermoplastic ester carbonate elastomer (TPECE). In the case of poly(polyamine) and ethylene carbonate (EC), the resultant oligomer or polymer with carbonate segment chemical structure is thermoplastic amide carbonate elastomer (TPACE). In the presence of a mixture of poly(polyol), poly(polyamine) and ethylene carbonate (EC), the resultant oligomer or polymer with carbonate segment chemical structure is thermoplastic amide ester carbonate elastomer (TPAECE).

In an embodiment of the present disclosure, the method of producing the oligomer or polymer with carbonate segment chemical structure which comprises thermoplastic polyester-carbonate elastomer (TPECE) expressed by formula III,

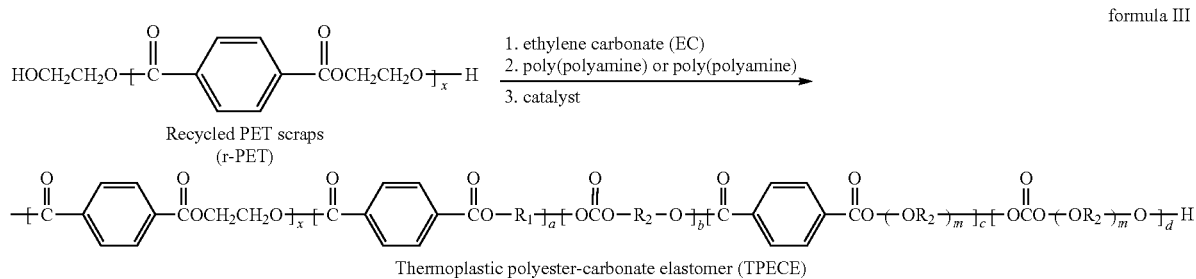

formula III $R_1$ and $R_2$ are functional groups derived from polyol, polyester polyol or polyether polyol; $R_3$ is branched or linear $C_{1-6}$ alkylidene or

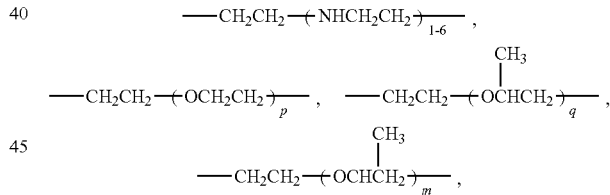

wherein p and q are integers ranging from 3 to 70; and m is an integer ranging from 3 to 50.

Upon simultaneous introduction of poly(polyol) and poly(polyamine), the resultant oligomer or polymer with carbonate segment chemical structure is expressed by formula IV.

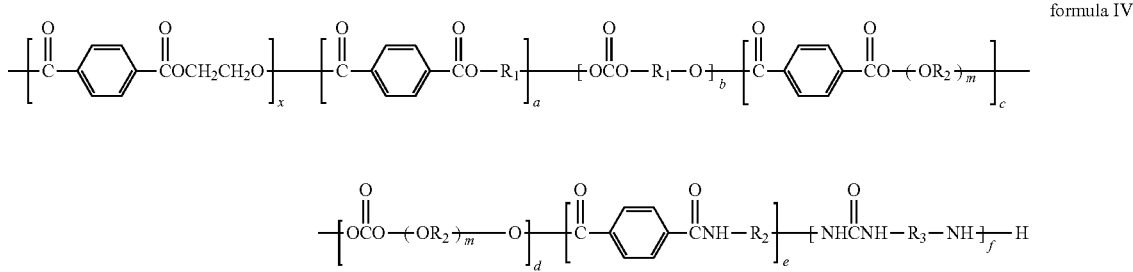

formula IV $R_1$ and $R_2$ are functional groups derived from polyol, polyester polyol or polyether polyol; $R_3$ is branched or linear $C_{1-6}$ alkylidene or

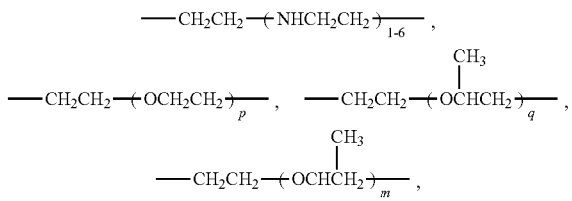

wherein p and q are integers ranging from 3 to 70; and m is an integer ranging from 3 to 50.

Preferably, x+a+b+c+d in formula III ranges from 50 to 500, and x+a+b+c+d+e+f in formula IV ranges from 50 to 500, but present disclosure is not limited thereto.

Regarding the oligomer or polymer with carbonate segment chemical structure, x+a+b+c+d ranges from 10 to 30 such that a plasticizer is formed.

Embodiment 1: thermoplastic elastomer of r-PET/PTMEG/EC (weight ratio: 68/29/3).

In embodiment 1, the weight ratio of polytetramethylene ether glycol (PTMEG) to polyethylene terephthalate (PET) is 30:70, and, in the presence of 2.7 wt % ethylene carbonate (EC) (molar ratio of PTMEG to EC is 1:1), thermoplastic ester carbonate elastomer (TPECE) is produced.

In embodiment 1, the process flow of producing the thermoplastic elastomer is described below.

A three-necked reactor with a mechanical blender, heater, Dean-Stark Trap, water-cooled condenser and vacuum pump is filled with PTMEG-1000 (105 g, 0.105 mole), EC (9.24 g, 0.105 mole) and titanium (which functions as a catalyst and measures 400 ppm in concentration when compared with the weight of the end product). Then, the three-necked reactor is heated to 150° C. In a blending process, some recycled PET scraps (245 g) are introduced into the three-necked reactor batch by batch. In a blending and heating process, sheets of the recycled PET scraps are dissolved gradually such that more sheets can be introduced. The recycled PET scraps are introduced batch by batch according to the dissolution speed. Gradually, the temperature is raised to 250° C. until all the PET sheets are dissolved in the PTMEG. Afterward, the reactor attains a high degree of vacuum (less than 10 torr) with two consecutive pumps. The ethylene glycol (EG) with a low boiling point of 196° C., which polycarbonate diol substitutes for, is removed with the Dean-Stark Trap. At 250° C., the ethylene glycol (EG) is completely removed in three hours, and around 6.51 g of EG is recycled. Then, the product is immediately and quickly introduced into a flask which contains 10 liter of cold water. The product is not only collected in the form of strips but also has high strength and resilience.

FIG. 1 shows the bending and appearance of the thermoplastic polyester-carbonate elastomer produced in embodiment 1.

Embodiment 2: thermoplastic elastomer of r-PET/PTMEG (weight ratio: 70/30).

In embodiment 2, weight ratio of polytetramethylene ether glycol (PTMEG) to polyethylene terephthalate (PET) is 30:70, for example, such that thermoplastic ester elastomer (TPEE) is produced.

In embodiment 2, the process flow of producing the thermoplastic elastomer is described below.

A three-necked reactor with a mechanical blender, heater, Dean-Stark Trap, water-cooled condenser and vacuum pump is filled with PTMEG-1000 (105 g, 0.105 mole) and titanium (which functions as a catalyst and measures 300 ppm in concentration when compared with the weight of the end product). Then, the three-necked reactor is heated to 150° C. In a blending process, some recycled PET scraps (245 g) is introduced into the three-necked reactor batch by batch. In a blending and heating process, sheets of the recycled PET scraps are dissolved gradually such that more sheets can be introduced. The recycled PET scraps are introduced batch by batch according to the dissolution speed. Gradually, the temperature is raised to 250° C. until all the PET sheets are dissolved in the PTMEG. Afterward, the reactor attains a high degree of vacuum (less than 10 torr) with two consecutive pumps. The ethylene glycol (EG) with a low boiling point of 196° C., which PTMEG substitutes for, is removed with the Dean-Stark Trap. At 250° C., the ethylene glycol (EG) is completely removed in three hours, and around 6.51 g of EG is recycled. Then, the product is immediately and quickly introduced into a flask which contains 10 liter of cold water. The product is not only collected in the form of strips but also has resilience.

The thermoplastic ester elastomer (TPEE) in embodiment 2 is produced in the absence of ethylene carbonate (EC). Referring to FIG. 2, TPEE of embodiment 2 has less strength and resilience than TPECE of embodiment 1 and thus is fragile and likely to sever.

Embodiments 3~13 use the same reactive process flow as embodiment 1. Since embodiments 3~12 differ from embodiment 1 in the types and proportions of reactants only, the types and proportions of reactants, rather than the reactive process flow, of embodiments 3~12 are described below.

Embodiment 3: in the presence of PTMEG-650 with a molecular weight of 650, with a weight ratio of PET/PTMEG being 70:30, for example, 2.7 wt % EC is introduced, so as to produce TPECE.

Embodiment 4: in the presence of PTMEG-1000 with a molecular weight of 1000, with a weight ratio of PET/PTMEG being 70:30, for example, 1.3 wt % EC is introduced, so as to produce TPECE.

Embodiment 5: in the presence of PTMEG-1000 with a molecular weight of 1000, with a weight ratio of PET/PTMEG being 70:30, for example, 2.7 wt % EC is introduced, so as to produce TPECE.

Embodiment 6: in the presence of PTMEG-2000 with a molecular weight of 2000, with a weight ratio of PET/PTMEG being 70:30, for example, 1.3 wt % EC is introduced, so as to produce TPECE.

Embodiment 7: in the presence of PTMEG-2000 with a molecular weight of 2000, with a weight ratio of PET/PTMEG being 70:30, for example, 2.7 wt % EC and 0.4 wt % trimethylolpropane (TMP) are introduced, so as to produce TPECE.

Embodiment 8: in the presence of PEG-600 with a molecular weight of 600, with a weight ratio of PET/PEG being 70:30, for example, 1.3 wt % EC is introduced, so as to produce TPECE.

Embodiment 9: in the presence of PEG-1000 with a molecular weight of 1000, with a weight ratio of PET/PEG being 70:30, for example, 2.7 wt % EC is introduced, so as to produce TPECE.

Embodiment 10: in the presence of PEG-2000 with a molecular weight of 2000, with a weight ratio of PET/PEG being 70:30, for example, 1.3 wt % EC is introduced, so as to produce TPECE.

Embodiment 11: in the presence of PET recycled scraps/ polyoxypropylene-diamine Jeffamine® D2000 (purchased from Huntsman Corp.), with its weight ratio being 70:30, 2.7 wt % EC is introduced, so as to produce thermoplastic amide carbonate elastomer (TPACE).

Embodiment 12: in the presence of PET recycled scraps and polyoxypropylene-diamine Jeffamine® D2000/PTMEG (purchased from Huntsman Corp.), with its weight ratio being 70:15:15, 2.7 wt % EC is introduced, so as to produce thermoplastic ester carbonate amide elastomer (TPECAE).

Embodiment 13: in the presence of the PET recycled scraps and PTMEG1000 with a weight ratio of 70:30, 5 wt % Caprolactam and 1.5 wt % EC are introduced, so as to produce thermoplastic ester carbonate amide elastomer (TPECAE).

Embodiment 14: in the presence of PTMEG-1000 with a molecular weight of 1000, with a weight ratio of PET/PTMEG being 70:30, for example, 2.7 wt % EC and 10 wt % Diethylene glycol are introduced, so as to produce thermoplastic ester carbonate elastomer (TPECE).

Embodiment 15: in the presence of PTMEG-1000 with a molecular weight of 1000, with a weight ratio of PET/PTMEG being 70:30, for example, 2.7 wt % EC, 10 wt % Diethylene glycol and 10 wt % 1,4-butanediol are introduced, so as to produce thermoplastic ester carbonate elastomer (TPECE).

Embodiment 16: in the presence of PTMEG-1000 with a molecular weight of 1000, with a weight ratio of EC/PTMEG/PET being 9/82/9, for example, polyester polycarbonate (PEPC) is produced.

Embodiment 17: in the presence of PTMEG-1000 with a molecular weight of 1000, with a weight ratio of EC/PTMEG/PET being 4/19/77, for example, polycarbonate polyester (PCPE) is produced.

Embodiment 18: PCPE or PEPC reacts with diisocyanate and 1,4-butanediol to produce thermoplastic polyurethane (TPU).

Compared with the prior art, the present disclosure provides an oligomer or polymer with carbonate segment chemical structure, whose production method entails turning high-molecular-weight polyester into the oligomer or polymer with carbonate segment chemical structure, so as to obtain the oligomer or polymer with carbonate segment chemical structure which is cost-effective enough to degrade high-molecular-weight polyester and perform polymerization anew. The oligomer or polymer with carbonate segment chemical structure, as produced by the method of the present disclosure, is applicable to automobile manufacturing, wires & cables, and medical equipment.

While the present disclosure has been described by means of specific embodiments, numerous modifications and variations could be made thereto by those skilled in the art without departing from the scope and spirit of the present disclosure set forth in the claims.

What is claimed is:

1. A method of producing an oligomer or polymer with carbonate segment chemical structure, the method comprising the steps of:

(1) introducing into a reactor high-molecular-weight polyester and reactive oligomer, wherein the high-molecular-weight polyester is expressed by formula (A),

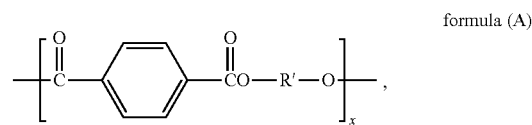

formula (A)

$R'$ is branched or linear $C_{1-6}$ alkylidene, wherein the reactive oligomer is one selected from the group consisting of poly(polyol) and poly(polyamine);

(2) introducing into the reactor a carbonate compound and a catalyst such that the poly(polyol) reacts with the carbonate monomers by one-pot in situ to produce oligomer polycarbonate diol compound (HO—R"—OC(O)—O—R"—OH), wherein R" is a functional group derived from polyol, polyester polyol or polyether polyol, partially substitute for the chemical structure (—O—R'—O—) in the high-molecular-weight polyester, remove, by vacuum distillation-based regulation, alcohol (HO—R'—OH) produced as a result of ester exchange reaction and substitution, so as to produce a crude product, wherein R" is a functional group derived from polyol, polyester polyol or polyether polyol, partially substitute for chemical structure (—O—R'—O—) in the high-molecular-weight polyester, remove, by vacuum distillation-based regulation, alcohol (HO—R'—OH) produced as a result of ester exchange reaction and substitution, so as to produce the crude product; and (3) introducing the crude product into water to obtain an oligomer or polymer with carbonate segment chemical structure.

2. The method of claim 1, wherein the high-molecular-weight polyester is polyethylene terephthalate (PET), and step (2) involves using at least part of the reactive oligomer to substitute for ethylenedioxy (—OCH$_2$CH$_2$O—) in the PET and removing, by vacuum distillation, ethylene glycol produced as a result of the substitution, so as to produce the crude product.

3. The method of claim 1, wherein the carbonate compound is one selected from the group consisting of ethylene carbonate, propylene carbonate, dimethyl carbonate, diethyl carbonate, and diphenyl carbonate.

4. The method of claim 1, wherein the poly(polyol) is one selected from the group consisting of polytetramethylene ether glycol (PTMEG), poly(propylene glycol), poly(ethylene glycol), polyether polyol, polyester polyol, polyester-ether polyol, and tri-functional poly(oxypropylene) polyol.

5. The method of claim 4, wherein a molecular weight of the polyether polyol ranges from 250 to 8000 g/mol.

6. The method of claim 2, wherein the poly(polyol) is one selected from the group consisting of polytetramethylene ether glycol (PTMEG), poly(propylene glycol), poly(ethylene glycol), polyether polyol, polyester polyol, polyester-ether polyol, and tri-functional poly(oxypropylene) polyol.

7. The method of claim 6, wherein a molecular weight of the polyether polyol ranges from 250 to 8000 g/mol.

8. The method of claim 3, wherein the poly(polyol) is one selected from the group consisting of polytetramethylene ether glycol (PTMEG), poly(propylene glycol), poly(ethylene glycol), polyether polyol, polyester polyol, polyester-ether polyol, and tri-functional poly(oxypropylene) polyol.

9. The method of claim 8, wherein a molecular weight of the polyether polyol ranges from 250 to 8000 g/mol.

10. The method of claim 1, wherein a weight ratio of the high-molecular-weight polyester to the reactive oligomer ranges from 95:5 to 30:70.

11. The method of claim 2, wherein a weight ratio of the high-molecular-weight polyester to the reactive oligomer ranges from 95:5 to 30:70.

12. The method of claim 3, wherein a weight ratio of the high-molecular-weight polyester to the reactive oligomer ranges from 95:5 to 30:70.

13. The method of claim 1, wherein the poly(polyamine) is one selected from the group consisting of poly(oxypropylene)-diamine, poly(oxyethylene)-diamine, ethylene diamine, diethylene-tri amine, triethylene-tetra-amine, tetra-ethylene-penta-amine, and 1,6-hexamethylene-diamine.

14. The method of claim 13, wherein a molecular weight of the poly(oxyalkylene)-diamine ranges from 250 to 6000 g/mol.

15. The method of claim 1, wherein a ratio of the poly(polyol) to the poly(polyamine) in a mixture thereof ranges from 1:9 to 9:1.

16. The method of claim 1, wherein the step (1) occurs in a nitrogen gas or aspirator vacuum environment.

17. The method of claim 1, wherein the catalyst is titanium (Ti) or antimony (Sb).

18. The method of claim 1, wherein the catalyst is 30~1000 ppm relative to the reactive oligomer.

19. The method of claim 1, wherein a weight ratio of the reactive oligomer to the high-molecular-weight polyester ranges from 5 to 70%.

20. The method of claim 2, wherein the PET is solid PET particles, recycled PET bottle debris or recycled fabric scraps.

* * * * *